June 30, 1964     R. F. REIFERS ETAL     3,139,348
BANANA TRAY AND PACKAGE

Filed Dec. 18, 1962                        2 Sheets-Sheet 1

INVENTORS
Richard F. Reifers
Thomas B. Kennedy &
William J. Hrozenchik

BY    *Karl W. Flocks*

ATTORNEY

June 30, 1964 R. F. REIFERS ETAL 3,139,348
BANANA TRAY AND PACKAGE
Filed Dec. 18, 1962 2 Sheets-Sheet 2

INVENTORS
Richard F. Reifers
Thomas B. Kennedy &
William J. Hrozenchik

BY  KARL W. FLOCKS

ATTORNEY 3,139,348
BANANA TRAY AND PACKAGE
Richard F. Reifers, New Canaan, and Thomas B. Kennedy and William J. Hrozenchik, Stamford, Conn., assignors to Diamond National Corporation, New York, N.Y., a corporation of Delaware
Filed Dec. 18, 1962, Ser. No. 245,603
12 Claims. (Cl. 99—171)

This invention relates generally to moulded articles, and more particularly to a moulded fruit tray particularly adapted for packaging bananas.

Bananas grow in bunches or clusters on a tree and the bunches comprise a plurality of "hands" or minor bunches hanging like a depending row of fingers. A "hand" of bananas is generally broken into smaller quantities of one or more bananas when sold at retail, these smaller quantities being conveniently described in this application as a "unit-hand" of bananas.

The "unit-hand" of bananas is asymmetrical in profile, i.e., the "unit-hand" is generally more stable on one side than on the other.

The "hand" of bananas generally grows with two bananas in a row radiating from a substantially semi-circular stem portion. Additionally, the "unit-hands" or smaller groups of bananas have a different curvature or arc from the stem to the end depending on the location in which the bananas grew on the "hand," i.e., near the outer ends thereof, and also where the hand was located on the stem of the banana vine.

Bananas, when sold retail, are generally displayed in "unit-hand" quantities, i.e., several bananas are still attached to a portion of the stem. Depending upon which side or end of the "hand" of bananas the "unit-hand" of bananas originally grew, will control as to which direction the stem should be directed in a display, since "unit-hands" of bananas can be properly described as being "right or left-handed."

Due to the variable dimensions of the bananas, and the manner in which they grow, bananas heretofore have not been a produce which is readily susceptible to good display and ready merchandising. Bananas were generally piled in a random fashion on a counter, and the customer did considerable handling and picking of the bananas which results in damage and loss of profits.

A primary object of the present invention is to provide a novel package of bananas formed by a novel banana tray which lends itself to improved techniques of displaying and merchandising of bananas.

A further object of the present invention is to provide a novel banana tray and package which has extreme dimensional stability; accommodates for "left and right-handed" "unit-hands" of bananas; accommodates for varying configurations and dimensions of the bananas; minimizes customer handling of the merchandise with accompanying reduction of damage and spoilage; and which affords flexibility in packaging different quantities or weights of bananas as well as lending itself to the formation of the package by automation.

Another important object of the present invention is to provide a novel banana tray in which the "unit-hand" of bananas being merchandised may be displayed on their sides to be readily observed or examined, when packaged, at both the inner and outer arcs, i.e., at the front and back of the bananas, which affords substantially 100 percent visibility for the person attempting to evaluate the bananas in terms of quality.

Another object of the present invention is to provide a banana tray which will accommodate two "unit-hands" of bananas and afford the advantages set forth above.

Other objects and the nature and advantages of the following invention will be apparent from the following description taken in conjunction with the accompanying drawings, wherein.

Figure 1:
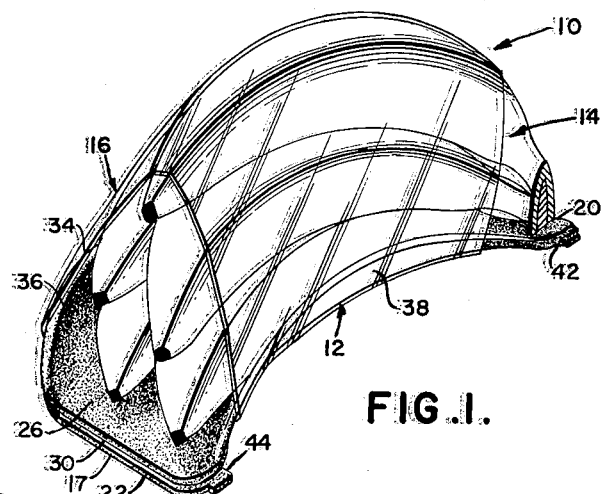
FIG. 1 is a perspective view of the novel banana tray and the banana package formed therewith.

Referring to the drawings in detail, a banana package is indicated generally at 10 and includes a packaging tray 12, a "unit-hand" of bananas 14 and overwrap means 16.

Packaging tray 12 is moulded from any suitable material and comprises an elongated body member 17 including a substantially flat, crescent-shaped bottom 18, i.e., bordered by spaced concave and convex side margins. The tray 12 is open at opposite ends, the bottom 18 including substantially uninterrupted marginal ends 20 and 22 which are substantially in the plane of upper surface of the bottom 18 and which will permit the ends of the bananas to project therebeyond.

Figure 4:
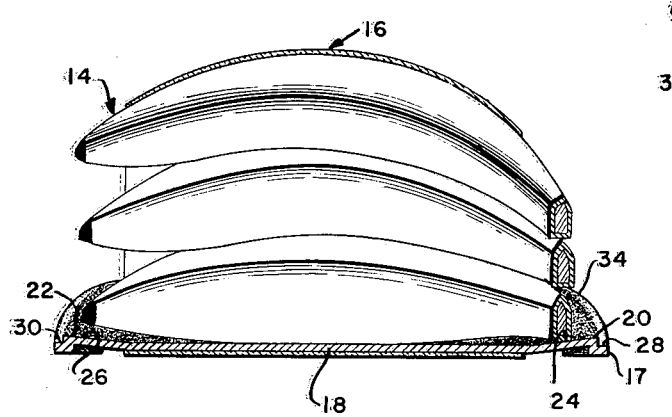
FIG. 4 is a longitudinal vertical section taken substantially on the plane of line 4—4 of FIG. 2.
Figure 5:
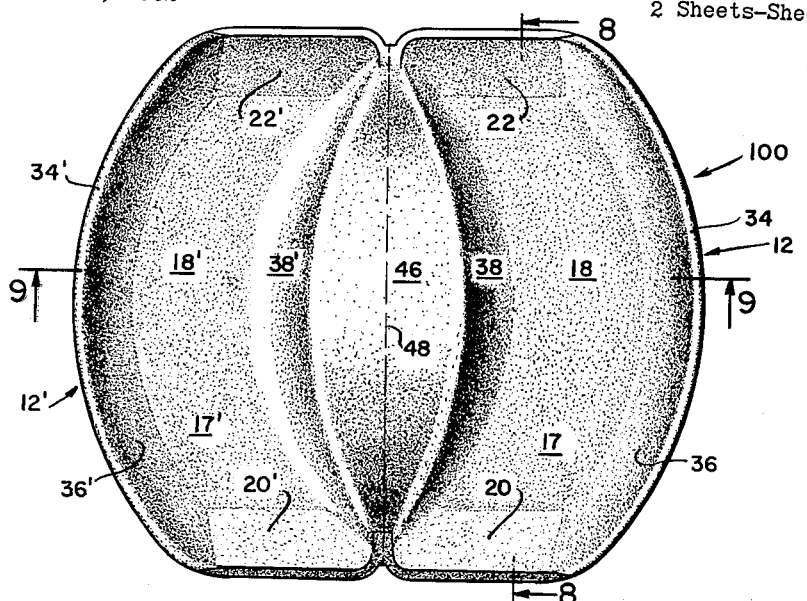
FIG. 5 is a top plan view of another embodiment of a novel banana tray which is utilized to form a package including two "unit-hands" of bananas.
Figure 6:
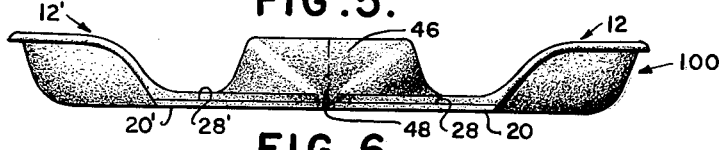
FIG. 6 is an end view looking at the lower edge of FIG. 5.
Figure 7:
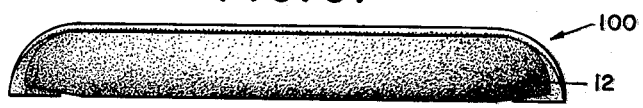
FIG. 7 is a rear elevation looking from right to left at FIGS. 5 and 6.
Figure 8:
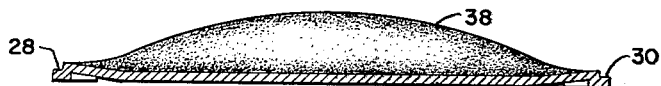
FIG. 8 is a longitudinal section taken substantially on the plane of line 8—8 of FIG. 5.

The bottom 18 of the tray includes inwardly of the ends thereof, slightly, upwardly-angled end portions 24 and 26 which terminate in L-shaped lip forming portions 28 and 30 (see FIG. 4) to form denesting grooves between nested trays, thus accommodating the trays for use in mechanical denesters.

The L shaped lip forming portions serve to support the bananas near the end since the bananas generally turn upwardly in this location. Further, these L-shaped lip portions afford structural rigidity in the relatively flat exposed end portion of the tray.

It will be noted that the double-capacity embodiment of FIGS. 5–9 comprises a pair of the packaging trays 12 disposed in opposed relationship. Thus, the details shown in FIGS. 6–9 also illustrate details of the packaging tray 12 of FIGS. 1–4.

Figure 2:
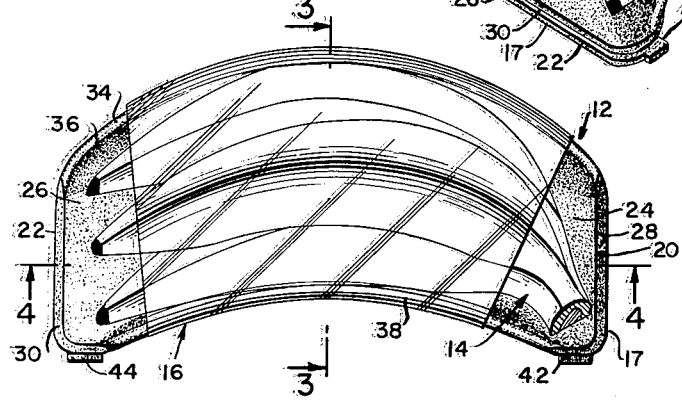
FIG. 2 is a top plan view of FIG. 1.

The body member 12 includes a vertical rear or outer wall 34 which extends integrally from the bottom 18 and merges therewith on a concave curve or surface 36, and which has a concave curve when viewed in plan as seen in FIG. 2, for example. The terminal ends of the wall 34 extend downwardly and merge into the end margin 20 and 22.

Extending vertically from the body member 17 is a front wall 38 which merges into the bottom member which has a compound concave-convex curve, extending vertically and merging with the bottom member 18 on a concave curve 40 (see FIG. 3) and has a convex curve as viewed in plan as seen in FIG. 2. The terminal ends of the inner or front wall 38 terminates inwardly of the side margins 20 and 22 (see FIG. 1) and define support feet 42 and 44 forwardly of the centermost portion of wall 38. The concave inner surface of wall 38 in effect forms a wedge to provide a support surface along the inner face of the "unit-hand" of bananas 14.

It will be observed from the drawings that the inner and front wall taper off on each end. It is possible by locating the "unit-hand" of bananas on the tray, either near or far away from the end along the wedge surface afforded by the inner wall, to progressively raise or lower the banana stem to maintain balance of the package.

This will be readily apparent, since small bananas tend to curve and require a higher support on the wedge surface as compared with larger bananas which have a more gradual curve and a stem which projects farther than the smaller bananas.

Figure 3:
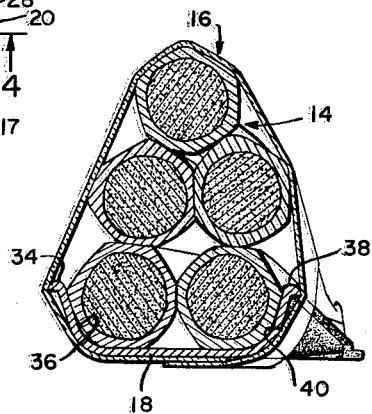
FIG. 3 is a transverse vertical section taken substantially on the plane of line 3—3 of FIG. 2.

The "unit-hand" of bananas 14 generally grows with two bananas in a row as clearly seen in FIGS. 1 and 3, and depending upon which end of the hand of bananas the "unit-hand" is originally grown, it has been found that the "unit-hand" of bananas will be more stable with the stem portion disposed in one side or the other of the packaging tray 12. It has been found that the "unit-hand" of bananas are actually "right" or "left" handed, and those "unit-hands" of bananas growing closer to the end of the "hand" of bananas has a greater radius than those growing in the center of a "hand" of bananas.

In a package formed in this invention, the major portion of the weight of a "unit-hand" of bananas will be located rearwardly of the center of the wall 38, and the feet 42, 44 will be disposed forwardly thereof. The feet provide two support points or surfaces forwardly of the center point of the wall 38, i.e. maximum load concentration, and provide extreme stability to the package formed by the tray.

The overwrap means 16 in the preferred embodiment comprises a heat-shrinkable film which is circumposed about the exposed surface of the "unit-hand" of bananas 14 and the undersurface of the packaging tray 12. Although a heat-shrinkable film is illustrated in the preferred embodiment, other overwrap means such as elastic bands, non-shrinkable transparent films, etc. may be used.

This type of package affords great variation by varying the number of bananas packaged, and loose bananas can also be packaged. Additionally, the packaging tray permits the consumer to carefully examine the bananas without disturbing the packaged condition thereof. This maintains a display of bananas in a relatively permanent condition, reduces consumer handling to a minimum with the accompanying reduction of bruising of the fruit.

Referring to FIGS. 5–9, a "twin packaging tray" is indicated generally at 100; this tray comprises opposed packaging tray members 12 and 12'. Each of the tray members 12 and 12' includes outer walls 34, 34', substantially flat bottom members 18 and 18', and inner or front walls 38 and 38', respectively, of the same character as those described with respect to FIGS. 1–4. The inner walls, 38, 38' are bridged by a moulded web 46 to provide structural strength to the two tray members 12, 12'. The web 46 can be omitted when individual packaging trays 12 or 12' are being manufactured and when producing this embodiment, a breaking line or line of severance is provided at 48 between the tray members.

It will be noted that the end margins 20, 20' and 22, 22' of the packaging tray members 12, 12' respectively, are uninterrupted to permit the ends of "unit-hands" of bananas to project therebeyond.

Figure 9:
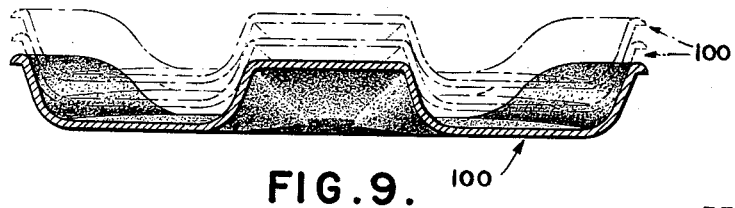
FIG. 9 is a transverse section taken substantially on the plane of line 9—9 of FIG. 5, and showing a plurality of the banana trays by phantom lines and in nested relation with respect to each other.

The embodiments of both FIGS. 1–4 and 5–9 are readily nestable as illustrated, for example, in FIG. 9. Various modifications will occur to those skilled in the art, for example, slight alterations of the end structure, inner wedge and outer wall, and thus it is intended that such minor alterations incorporating the structural and functional principles of the invention are contemplated to be within the scope of the invention as disclosed.

The novel banana packaging tray and package formed thereby has extreme stability, permits displays of bananas to be readily formed, permits versatility or variation in the kind of bananas packed, and accordingly weight of the individual packages permits the consumer to readily examine the contents of the package with a minimum of handling or squeezing, and accordingly provides a unique packaging for fruit having the unusual curve and configuration that bananas naturally have.

It will be obvious to those skilled in the art that various changes may be made without departing from the scope of the invention and therefore the invention is not intended to be limited to what is shown in the drawings and described in the specification, but only as set forth in the appended claims.

We claim:

1. An open-ended, moulded banana packaging tray comprising a one-piece, elongated body member comprising a substantially flat, crescent-shaped bottom terminating in open end margins, said body member including a rear wall extending vertically from said bottom in a concave curve merging into said bottom, said rear wall having a concave curve along its length and terminating at its open ends adjacent the end margins of said bottom, said body member including a front wall extending vertically from said bottom in a concave curve merging into said bottom, said front wall having a convex curve along its length and terminating adjacent said open end margins in transversely spaced relation from the ends of said rear wall, the inner surface of said front wall forming a wedge surface for supporting therealong and displaying the bananas on their side to facilitate examination of those portions normally subject to bruising the stem portion of a "unit-hand" of bananas.

2. A tray as set forth in claim 1 in which said open end margins are substantially in the plane of said bottom.

3. A tray as set forth in claim 1 in which said front wall merges into support feet disposed forwardly of the center of said front wall for affording package stability.

4. The structure of claim 1 in which said open end margins include lower support surfaces substantially coplanar with the lower surface of said tray bottom.

5. The structure of claim 1 in which said tray bottom has upwardly inclined end surfaces terminating in L-shaped ledges at the end margins of said body member, said ledge portions having a lower surface coplanar with said tray bottom.

6. The structure of claim 5 in which said ledges are substantially linear and merge terminally at a curved juncture with said front and rear walls.

7. The structure of claim 1 in which said uninterrupted open end margins are substantially parallel.

8. A package of bananas comprising in combination with a "unit-hand" of bananas, an open-ended packaging tray supporting said "unit-hand" of bananas in a stable condition therein, said open tray comprising a substantially flat, crescent shaped bottom conforming generally to the shape of the "unit-hand" of bananas and including end margins generally in the plane of said flat bottom permitting portions of the bananas to project therebeyond, said tray including a rear wall extending vertically on a concave curve merging into said bottom and having a concave curve along its length, said tray including a front wall extending vertically from said bottom on a merging concave curve and having a stable wedge support engaged by a stem portion of the "unit-hand" of bananas, said front wall merging into support feet disposed forwardly of the center of said front wall and preventing tilting of said package forwardly, of said front walls, and overwrap means circumposed about said "unit-hand" of bananas and said tray.

9. An open-ended moulded banana packaging tray comprising a pair of opposed packaging members each including an elongated body member comprising a substantially flat, crescent-shaped bottom having open end margins, said body members each including outer walls extending vertically from said bottoms on a concave curve merging into said bottom, said outer walls having a concave curve along their length and terminating in transversely spaced relation in said end margin, said body members each including inner walls extending vertically from the respective bottom members on a concave curve merging into said bottom, said inner walls extending the length of the respective bottoms on a convex curve, said body member including support feet disposed forwardly of the center of said inner walls.

10. The structure of claim 9 including a transverse web integral with and bridging said inner walls.

11. An open-ended moulded banana packaging tray for displaying a "unit-hand" of bananas on its side to afford maximum customer observation, comprising a one-piece, elongated body member including a substantially flat bottom, said body member including spaced front and rear walls along the length thereof, said front wall including a wedge surface along the length thereof for supporting therealong the stem portion of a "unit-hand" of bananas and permitting the "unit-hand" of bananas to be oriented along the length of said wedge surface to attain the most stable position for side-displayed bananas, said bottom including support feet forwardly of said front wall for providing package stability to a package formed with said tray.

12. The structure of claim 11 in which said body member includes open end margins extending between said front and rear walls, said open end margins including lower support surfaces substantially coplanar with the lower surface of said bottom.

References Cited in the file of this patent

UNITED STATES PATENTS

| | | |
|---|---|---|
| 1,917,491 | Bowerman | July 11, 1933 |
| 2,687,246 | Randall | Aug. 24, 1954 |
| 2,920,805 | Reifers | Jan. 12, 1960 |
| 3,027,997 | Reifers | Apr. 3, 1962 |